No. 761,790. PATENTED JUNE 7, 1904.
G. F. STEEDMAN.
PNEUMATIC ELEVATOR.
APPLICATION FILED FEB. 9, 1901.
NO MODEL. 5 SHEETS—SHEET 3.

ATTEST—
Harry L. Ames.
George Bakewell

INVENTOR—
George F. Steedman.
By Bakewell & Cornwall
Att'ys

No. 761,790. PATENTED JUNE 7, 1904.
G. F. STEEDMAN.
PNEUMATIC ELEVATOR.
APPLICATION FILED FEB. 9, 1901.

NO MODEL. 5 SHEETS—SHEET 5.

ATTEST-
G. A. Pennington
Gales P. Moore

INVENTOR-
George F. Steedman,
By Bakewell & Kornwall
Attys.

No. 761,790.

Patented June 7, 1904.

UNITED STATES PATENT OFFICE.

GEORGE F. STEEDMAN, OF ST. LOUIS, MISSOURI.

PNEUMATIC ELEVATOR.

SPECIFICATION forming part of Letters Patent No. 761,790, dated June 7, 1904.

Application filed February 9, 1901. Serial No. 46,651. (No model.)

*To all whom it may concern:*

Be it known that I, GEORGE F. STEEDMAN, a citizen of the United States, residing at the city of St. Louis, in the State of Missouri, have invented a certain new and useful Improvement in Pneumatic Elevators, of which the following is a full, clear, and exact description, such as will enable others skilled in the art to which it appertains to make and use the same, reference being had to the accompanying drawings, forming part of this specification, in which—

Fig. 1ª is a detail view of the hand-rope controlling mechanism.

This invention relates to a new and useful improvement in pneumatic elevators, the object being to construct an elevator of the character described in such manner that when the cage is at the top floor of a building a maximum pressure is admitted to the cylinder sufficient to sustain the cage at the top floor, notwithstanding that said cage may be loaded with a maximum number of pounds of freight. By this provision the cage is not affected by varying loads which may be delivered thereon or discharged therefrom, and consequently it is unnecessary for the attendant to manipulate the controlling-valve of the cylinder to admit or exhaust pressure therefrom commensurate with the weight of the load upon the cage for the purpose of holding said cage in its desired position.

Another object is to provide a mechanism for coöperating with the hand-rope, so that the speed of the cage, loaded and unloaded and in its ascending or descending movement, will be relatively safe. If the operator throws the valve open to cause the cage to travel at a greater speed than that at which it was originally designed to travel, then the mechanism before referred to automatically restores the valve to a normal service running position. The operator may, however, by holding on to the hand-rope, cause the cage to travel at a high speed, which means that the operator, if on the car, must climb the rope in order to hold the valve in its abnormal position. When the rope is released, assuming that the valve is in an abnormal position, the automatic mechanism before referred to returns the rope, so as to move the valve to its service running position. Still other objects are to simplify the details of construction of elevators of this class, rendering them safe and serviceable and at the same time minimizing the moving parts, so that there will be a small amount of wear, and consequently few repairs.

With these objects in view the invention consists in the construction, arrangement, and combination of the several parts, all as will hereinafter be described and afterward pointed out in the claims.

In the drawings I have illustrated an elevator-cage in the form of a platform A, guided in its vertical movement by posts B, said cage having the usual yoke C, carrying buffers, as commonly employed, to which yoke is attached the hoisting ropes or cables $d$, passing over sheaves D and around the piston-sheave E, mounted in the end of the piston-rod of the cylinder F. The end of this rope after passing around the sheave E is attached at some suitable point, as is well understood. The usual counterbalance-cable $g$ is preferably connected to the yoke C and passes over sheaves G at the top of the shaft, the lower end of said cable coöperating with counterweights $g'$. So far as this construction is concerned I do not claim the same here, as it forms no part of my present invention. Furthermore, the details of the above-mentioned parts may be such as are now commonly employed.

Figure 2:
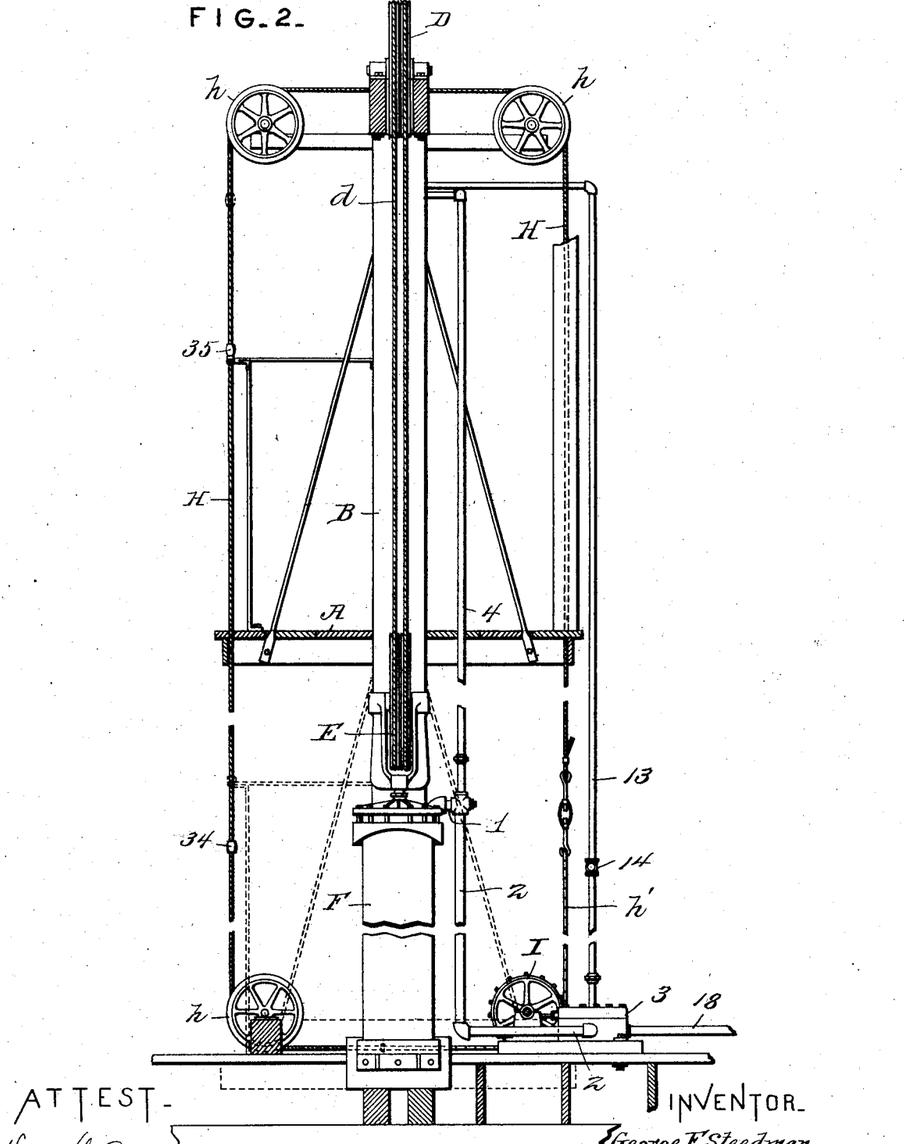
Fig. 2 is a side elevational view, partly in section, of my improved pneumatic elevator.
Figure 3:
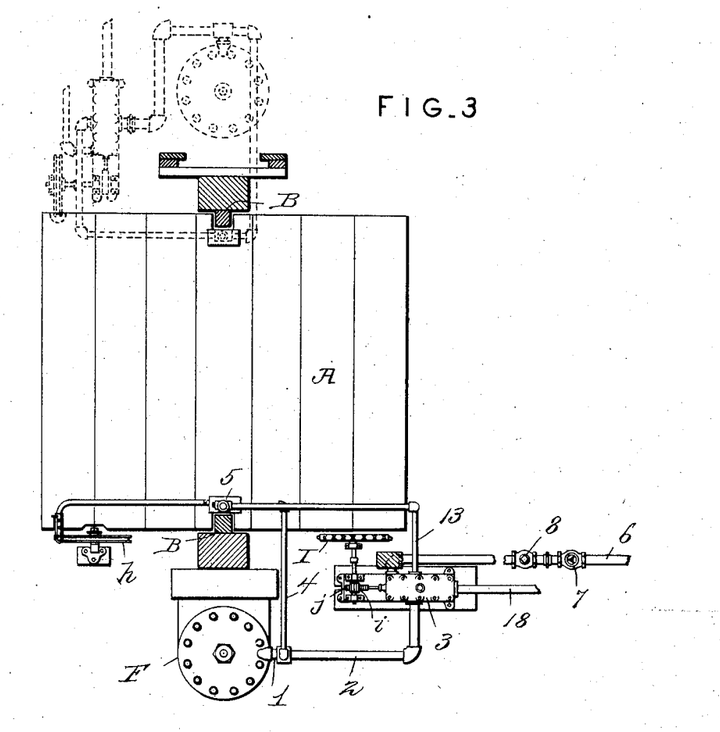
Fig. 3 is a horizontal sectional view showing the valve mechanism and pipe connections.

Referring now to Figs. 2 and 3, it will be observed that a pipe 1 enters the top of the cylinder F, said pipe opening into the branch 2, which leads into a valve-casing 3, while a branch pipe 4 communicates with said pipe 1 and connects with a valve-casing 5, located at the top of the shaft. The pipe 2 may be designated as the ordinary "service-pipe" for admitting and exhausting pressure to the cylinder F, whereby the elevator-cage is caused to ascend and descend, while the pipe 4 may be designated as an "auxiliary" for admitting maximum pressure to the cylinder F when the cage is at the upper extremity of its travel. This pipe 4 does not in any way control the exhaust of pressure from the cylinder.

Referring particularly to Fig. 2, it will be seen that the controlling-rope H passes over suitable sheaves $h$ at the top and bottom of the shaft, one side of said rope being located in juxtaposition to the cage, so as to be within easy reach of the operator on the cage. One section or portion of this controlling-rope is made up of a sprocket-chain $h'$, which coöperates with a sprocket I, the shaft of which sprocket-wheel carries a pinion $i$, (see Fig. 8,) meshing with a rack $j$, which rack is connected to a sliding D-valve J, arranged in the valve-casing 3. Thus it will be seen that by moving the hand-rope the valve J may be adjusted, its changed position effecting the exhaust of pressure from the cylinder F and the admission of pressure to said cylinder to cause the elevator-cage to ascend and the full admission of pressure to the auxiliary valve located at the upper end of the shaft.

Referring now to Fig. 3, the inlet-pipe 6, which leads from some suitable source of compressed-air supply, is preferably provided with a globe-valve 7 for well-understood purposes and for similar reasons a check-valve 8, which check-valve opens toward the hoist. The compressed air entering the valve-casing 3 is received in a chamber 9, which is in constant communication with the chamber 10, in which the valve J is located. Thus chambers 9 and 10 are constantly connected to the source of compressed-air supply. An opening 11 is arranged in the top of the valve-casing 3 for receiving an oil-cup whereby the seat of valve J may be lubricated.

Figures 4, 5:
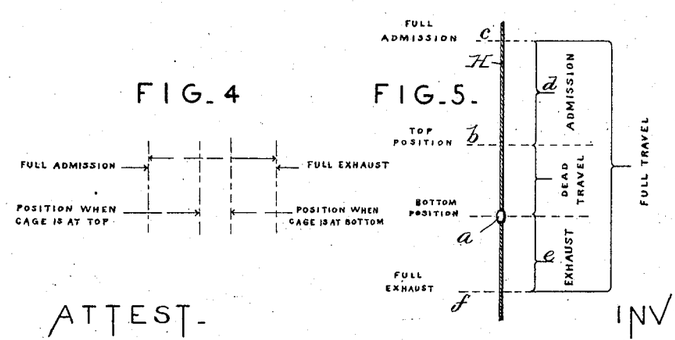
Fig. 4 is a diagrammatic view illustrating the valve travel.
Fig. 5 is a diagrammatic view illustrating the position of the hand-rope with respect to its control of the valve.
Figure 6:
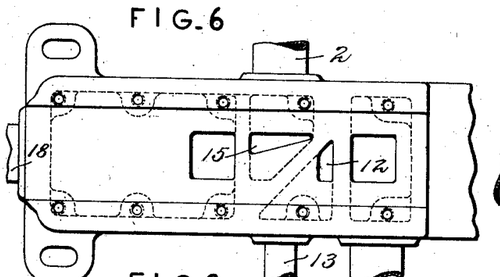
Fig. 6 is a plan view of the main valve-casing, illustrating the seat over which the D or slide valve travels.
Figure 7:
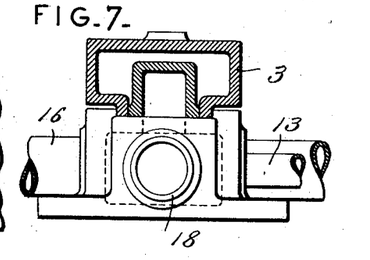
Fig. 7 is an end elevational view, partly in section, of said main-valve casing.
Figure 8:
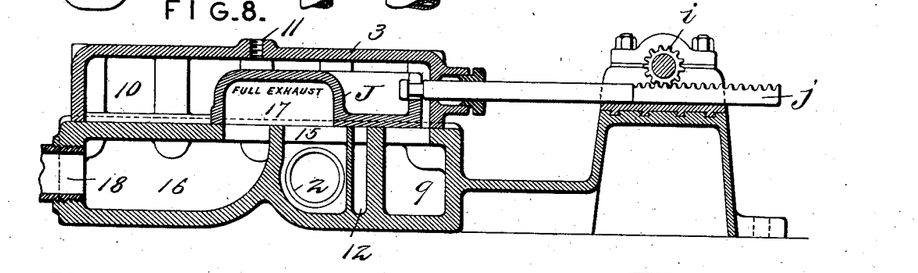
Figs. 8, 9, 10, and 11 are longitudinal sectional views of said main valve, showing the same in different positions.
Figure 9:
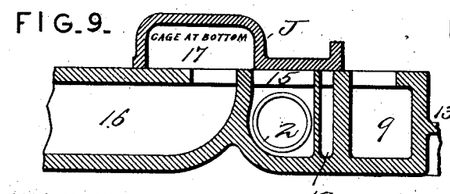
Figure 10:
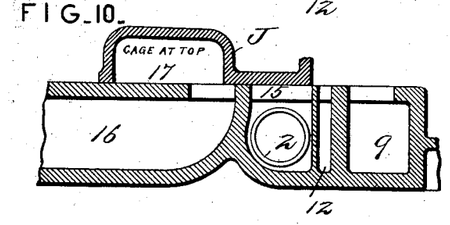
Figure 11:
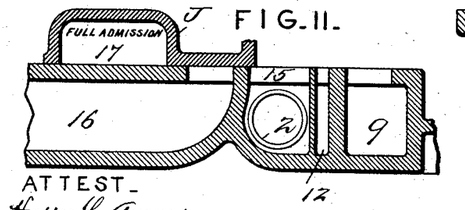
Figure 14:
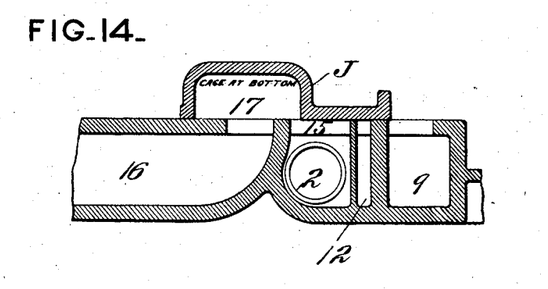
Fig. 14 is a longitudinal sectional view of the main valve, showing the position of said valve when the cage is automatically brought to rest at the bottom of the shaft.
Figure 15:
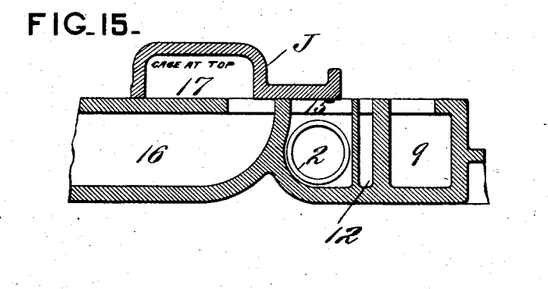
Fig. 15 is a view generally similar to the above, said view showing the position of the main valve when the cage is automatically brought to rest at the top of the shaft.

The valve J, heretofore referred to, has a forward extension designed to open and close communication between the source of supply of motive fluid, the auxiliary valve, and the cylinder F, and when said valve is in what may be termed its "forward" position its cavity establishes communication between the cylinder F and the exhaust-port leading from the valve-casing 3, which will hereinafter be more fully described. Assuming that the valve is in the position shown in Fig. 14, which is the position it occupies when the cage is at the bottom, it will be seen that the passage is open for chamber 15 to exhaust through the recess 17 of the valve J, and in order to start the cage on its upward travel said exhaust must first be closed, which is done by moving said valve to the left. Upon closing the exhaust continued movement of said valve will first establish communication with the chamber 12, thence through such chamber and pipe 13 to the auxiliary valve 5, which is in constant communication with supply during the upward travel of the cage. A stop-cock 14 is preferably arranged in the length of this pipe 13. After the port to chamber 12 is opened to admit pressure to the auxiliary valve at the top of the shaft the forward edge of valve J commences to open a triangular-shaped port leading into a chamber 15, from which chamber leads a pipe, the pipe 2 connecting with the upper end of the cylinder F to admit thereto the motive fluid. The port opening into this chamber 15 is of such shape that the admission of motive fluid can be regulated to a fine degree, and this is important, as when the cage is ascending it is only necessary to move the valve J and open the port leading into the chamber 15 a sufficient distance to admit the proper amount of pressure at the upper end of the cylinder F to raise the cage and its carried weight at proper speed. If a greater amount of pressure is required, the valve may be moved rearwardly a greater extent, and so render a larger opening available for the passage of motive fluid to the cylinder. In Fig. 10 is illustrated a position of the parts where the chamber 12 is in communication with the live motive fluid, the slide-valve J being on the verge of opening the port leading to chamber 15. In Fig. 15 the said valve is illustrated as having been moved sufficiently to partially uncover the port leading to the chamber 15, whereby the motive fluid passes through said chamber 15 to the pipe 2 and thence to the cylinder F, whereupon the said cylinder being supplied with motive fluid the cage A is caused to ascend in a manner which will be readily understood, while in Fig. 11 the port leading to chamber 15 is shown fully open, so that full admission of motive fluid is had with respect to the cylinder F. When it is desired for any reason to arrest the upward movement of the cage, it is only necessary to move the valve J forwardly until the port leading to chamber 15 is closed, as shown in Fig. 10, when, if the weight on the cage is constant, the cage will remain in a stationary position. When the valve J closes the port to chamber 15, it will be observed that the port to chamber 12 is open for the admission of motive fluid to the auxiliary valve at the top of the shaft. In the event that it is desired to cause the cage to descend the control-rope is so manipulated as to move the valve J forwardly, and in so doing, assuming that the valve was fully admitting pressure to the cylinder, said valve would first close the port to chamber 15, then close the port to chamber 12, occupying a lapped position, as shown in Fig. 9, and a further forward movement being imparted to the valve said valve establishes communication between chamber 15 and an exhaust-chamber 16 through the recess 17 in the valve J, as shown in Fig. 14. This chamber 16 connects with an exhaust-pipe 18, leading from the end of the valve-casing 3 to any suitable point. The control by the valve J of the inlet and exhaust ports is such that there is some dead travel of the controlling-rope, rendering said valve sensitive beyond certain limits. This travel of the controlling-rope is indicated in Fig. 5, wherein we will assume that a point $a$ on the controlling-rope corresponds to the position of the valve shown in Fig. 9. To exhaust the pressure, it is only necessary to move the rope, as shown in Fig. 5, downwardly, when communication between the cylinder and the exhaust-pipe 18 will be established, as shown in Fig. 14. However, the safe position, or the position of dead travel, is upwardly to the dotted line $b$, during which travel of the rope the forward edge of valve J is moving past the port leading to chamber 12 and to the position shown in Fig. 10. From dotted line $b$ to dotted line $c$ the admission of fluid through the port opening into chamber 15 is variable, and when dotted line $c$ is reached the full open position of the valve is effected, the valve being in the position shown in Fig. 11. This full admission of pressure to the cylinder F is seldom required in service, except where the cage is loaded beyond its rated capacity or it is desired to run the cage at a high speed for a light load.

Figures 1, 1A:
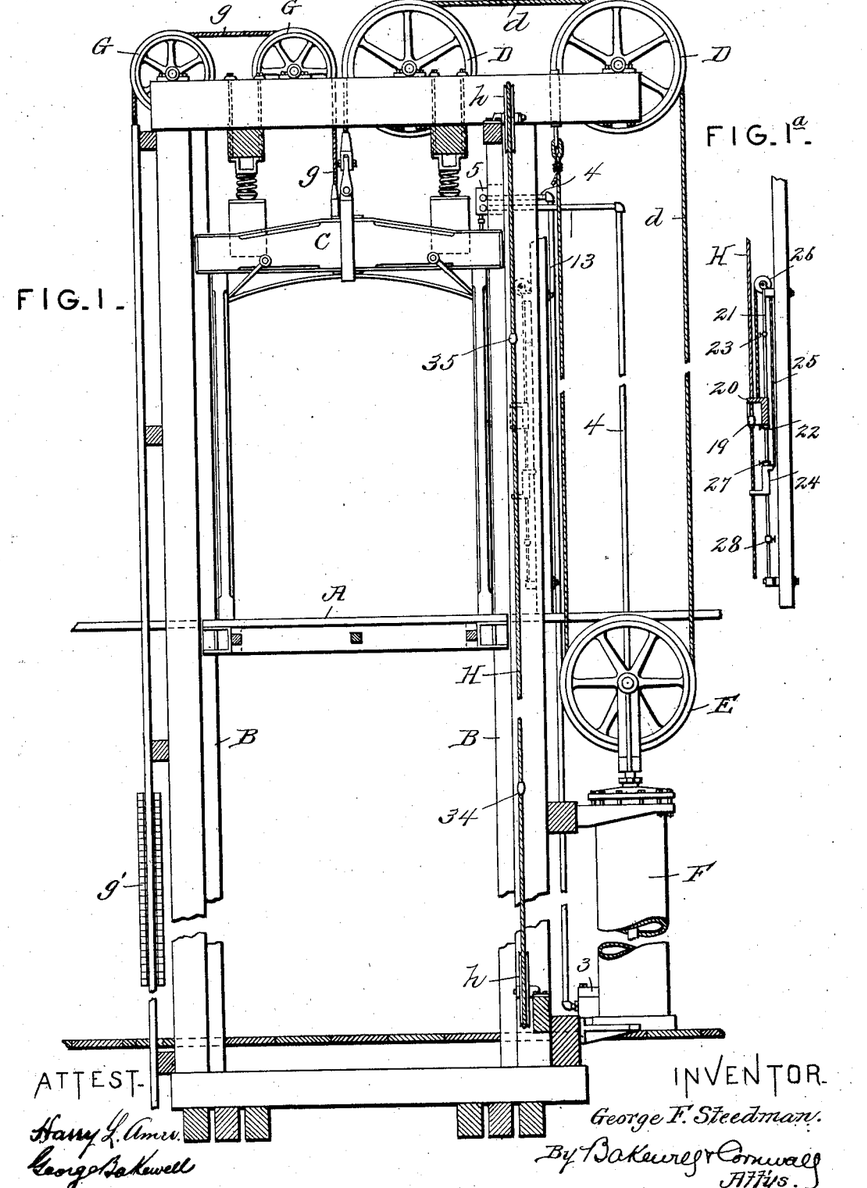
Figure 1 is a front elevational view of my improved pneumatic elevator.

The mechanism for controlling the speed of the elevator is shown in Figs. 1 and 1ª, wherein it will be seen that the controlling-rope H is provided with a button 19, which is designed in its upward travel to contact with a slidable weight 20, arranged to correspond with the predetermined limit of movement of the valve, (indicated at the point $d$, Fig. 5.) If the controlling-rope is manipulated so as to lift the weight 20, or, in other words, the travel of the valve J exceeds a position where the elevator will run at a normal speed, the instant that the rope is released the weight 20 will act to restore said rope and return the valve to its normal open position. It is thus impossible for an operator to throw the valve J and admit an amount of pressure which would cause the elevator to travel at a higher rate of speed than that predetermined upon, the operator leaving the valve in such abnormal position. The speed of travel of the empty cage may be adjusted by the relative positions of the button 19 and the weight 20. It is desirable that the button be permanently attached to the controlling-rope, and to adjust the position of the weight with respect thereto I arrange said weight on a guiding-rod 21, on which rod is arranged an adjustable collar 22 for supporting the weight. This rod also has an adjustable collar 23 for limiting the upward movement of the weight, and thus preventing the valve from being manipulated beyond its designed limit of movement. To control the exhaust, a block 24 is slidingly mounted on the rod 21, which block embraces the controlling-rope at a point beneath the button 19. Thus when the rope is manipulated so as to cause said button to move from points corresponding to $d$ and $e$, Fig. 5, $e$ being the upper face of block 24, with which the button 19 contacts, it will be seen that any movement beneath the point $e$ will cause the block 24 to descend. This block 24 is connected with the weight 20 by means of a chain 25, passing over a pulley 26 at the upper end of the rod 21, so that when the button 19 contacts with the block 24, causing said block to descend, the weight 20 is elevated, and if the control-rope is released under such conditions, the weight 20 will cause the controlling-rope to be restored to its normal exhaust position (indicated at $e$, Fig. 5) through the instrumentalities before mentioned. The position of block 24 is adjustable by means of a collar 27, arranged on the rod 21, which means, of course, that the length of the chain 25 corresponds to the variation in position of this block and its coöperating weight 20. A stop-collar 28 is also arranged on the rod 21 for limiting the downward movement of the block 24, which downward movement is less than the possible upward movement of the weight 20 on account of the smaller amount of abnormal travel of the valve J in exhausting from the cylinder F. The dotted line $f$ in Fig. 5 indicates the abnormal or full open position of the valve J with respect to exhausting the pressure from the cylinder F, which abnormal position is illustrated in Fig. 8 of the drawings and corresponds to a position wherein the button 19 on the control-rope forces the block 24 downwardly into contact with the stop 28. Of course, the cage having reached its lower limit of travel, the substantially full opening of the port 15, as shown in Fig. 8, need not be preserved in order to hold the cage at said lower limit. When the cage is in lowermost position, the extent of opening of the port 15 (shown in Fig. 14) is ample to permit the exhaust from the cylinder F of any motive fluid which might be in the cylinder at the time the cage reaches its lowermost position or might leak into said cylinder when the cage is in said position.

From the above it will be seen that the movement of the controlling-valve for admitting and exhausting pressure to and from the cylinder is confined between certain limits, which limits represent the normal speed at which it is determined that the cage shall ascend and descend when unloaded. Between these limits the valve is adjustable, so as to cause the ascent or descent to be at any speed less than normal that is desired. When the cage is loaded, it follows that if the predetermined speed is slower than that desired it is possible for the operator, if on the cage, to climb the rope (figuratively speaking) and hold the weight 20 in an elevated position, so as to place the valve J in an abnormal position and admit or exhaust a greater volume of pressure to or from the cylinder F, depending upon the direction in which the cage is traveling, or if the operator is standing on one of the floors of the building he may hold the control-rope in an abnormal position to effect this end. However, it is impossible for an operator to leave the control-rope unattended and have the elevator travel at a greater speed than predetermined upon, because the weight 20 will automatically restore the valve J to either of its normal limits. By adjusting the position of the weight 20 and the block 24 with respect to the button 19 (taking into consideration the travel of the valve J) it follows that the speed of the unloaded cage may be regulated.

I have heretofore referred to the desirability of admitting full pressure into the cylinder F when the cage is at the top of the shaft for the purpose of locking the cage in its elevated position and preventing the sinking thereof should there be a leakage in the system or when the empty or lightly-loaded cage receives its load. I accomplish this by the employment of an auxiliary valve arranged at some suitable point, but which is controlled, preferably, by the movable cage, so that when the cage is at the top floor it will actuate said auxiliary valve and admit full pressure into the cylinder F independent of the admission of pressure to said cylinder by way of the valve-casing 3.

Figure 12:
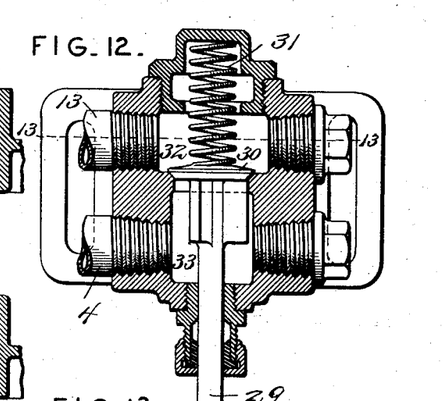
Fig. 12 is a longitudinal sectional view of the auxiliary valve, said view being taken on line 12 12, Fig. 13.
Figure 13:
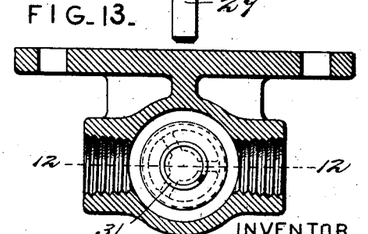
Fig. 13 is a sectional view taken on line 13 13, Fig. 12.

Referring now to Fig. 1, it will be seen that a valve-casing 5 is bolted to one of the guideposts B, and through the lower side of said valve-casing (see Fig. 12) projects a valve-stem 29, designed to be struck by the yoke C or a projection thereon when the cage is at the top of the shaft. This stem 29 carries a valve 30, which is held to its seat by a suitable spring 31, said valve normally closing communication between chambers 32 and 33 in said valve-casing, into the former of which leads the pipe 13, before referred to, and from the latter of which leads the pipe 4, connecting with the top of the cylinder F. Whenever the cage is elevated the pressure of the cylinder F is admitted to said cylinder through the pipe 2, and before pressure is admitted to said pipe 2 pressure is admitted to the chamber 12 and to the pipe 13, so that the chamber 32 receives pressure before the cage starts upward. The cage continuing its upward movement will come in contact with the valve-stem 29, raising the valve 30 and establishing communication between the chambers 32 and 33, so that irrespective of the available area opening into the chamber 15 the instant that the elevator strikes the valve-stem 29 full pressure is turned into the cylinder F, which pressure holds the cage in its elevated position and likewise sustains the valve-stem 29 in its elevated position. Under these conditions the elevator-cage is practically locked and may receive its full proper load without sinking and without requiring any attention on the part of the operator in manipulating the control-rope to admit more pressure as the load is added to the cage. So, also, will the cage be locked in its elevated position, which is the extreme limit of movement when discharging a load. When it is desired to cause the cage to descend from its position at the top of the shaft, the elevator-rope is so manipulated as to move the valve J forwardly, which valve, as shown in Fig. 9, first closes the admission of pressure through the pipe 2, then closes the admission of pressure through the pipes 13 and 4, and finally establishes communication between the cylinder and the exhaust-pipe 18, through the pipe 2, chamber 15, chamber 17, and space 16, from which the exhaust-pipe 18 leads. The speed of the descent of the elevator can be controlled by the position of valve J, as before described. Thus it will be seen that according to the adjustment of the valve J and the auxiliary-valve connections said chamber 15 serves the purpose of an admission and an exhaust chamber. The controlling-rope is provided with the usual stop-buttons 34 and 35 for coöperating with an arm on the cage, whereby if the cage is started on its upward or downward movement unattended said arm will contact with one or the other of said buttons and manipulate the valve J so as to bring the cage to a position of rest at either extremity of the shaft. It is evident that as the cage approaches its upper or lower limit the arm on the cage engages with the stops on the hand-rope, and so slows down the motion of the cage, so that the cage does not reach its limit suddenly with a bump, but approaches its limit with a gradually-decreasing speed and stops quietly.

In Fig. 3 I have shown the hoisting-cylinder and pipe connections in dotted lines on the opposite side of the shaft, this being an alternative position of the valves, sheaves, and piping.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. The combination with a hoisting-cylinder, of a valve for controlling the admission and exhaust of pressure to and from said cylinder, said valve including a casing having a chamber at one end into which the inlet-pipe leads, a chamber at the opposite end from which the outlet-pipe leads, an intermediate chamber having a graded port which communicates with the inlet or exhaust chambers, and a chamber in communication with an auxiliary valve; substantially as described.

2. The combination with a hoisting-cylinder, of means for controlling the pressure of fluid therein, said means comprising a valve-casing having pressure and exhaust chambers, two chambers intermediate said pressure and exhaust chambers and connected to one end of said cylinder by suitable pipes, a port opening between each of said intermediate chambers and the said pressure-chamber, a slide-valve for controlling the ports leading to and from said chambers, means for operating said slide-valve, and an auxiliary valve controlling the pipe connecting one of said intermediate chambers and said cylinders; substantially as described.

3. In a pneumatic elevator, the combination with the cage, cables and hoisting-cylinder, of a valve for permitting exhaust from the upper portion of said cylinder, and independently-operable means operated by the cage when at a point at which it is designed to rest for admitting into the cylinder sufficient additional pressure to hold the cage at said point; substantially as described.

4. In a pneumatic elevator, the combination with the cage, cables and hoisting-cylinder, of a valve for permitting exhaust from the upper portion of said cylinder, and independently-operable means operated by the cage when at the top of the shaft for admitting full pressure into the cylinder; substantially as described.

5. In a pneumatic elevator, the combination with the cage, cables and hoisting-cylinder, of a valve for controlling pressure in said cylinder, and an auxiliary valve operated by the cage when at the top of the shaft for admitting full pressure into the cylinder and holding the cage in its elevated position; substantially as described.

6. In an elevator, the combination with the cage, cables and hoisting-cylinder, of a single source of fluid-pressure, a plurality of passages leading therefrom to said cylinder, a main valve controlling one of said passages, an auxiliary valve controlling the other of said passages, and means for operating said valves; substantially as described.

7. In an elevator, the combination with the cage, cables and hoisting-cylinder, of a single source of fluid-pressure, a passage leading therefrom to said cylinder, a branch passage leading from said first-mentioned passage to said cylinder, a main valve controlling said first-mentioned passage and said branch passage, an auxiliary valve between said main valve and said cylinder and controlling said auxiliary passage, and means for operating said valves; substantially as described.

8. In an elevator, the combination with the cage, cables and hoisting-cylinder, of a single source of fluid-pressure, a passage leading therefrom to said cylinder, a branch passage leading from said first-mentioned passage to said cylinder, a main valve controlling said first-mentioned passage and said branch passage, an auxiliary valve between said main valve and said cylinder and controlling said auxiliary passage, and means for operating said valves, the said parts being so arranged that the passage between said source of pressure and said auxiliary valve is open during the entire period that the passage between said source of pressure and said cylinder is open; substantially as described.

9. In a pneumatic elevator, the combination with a cage, a hoisting-cylinder having a motive-fluid port, and a piston in said cylinder connected to said cage, of a valve controlling said port to said cylinder, an automatic pneumatic lock for said cage when in elevated position, said lock including an air-receiving receptacle having a port and in communication with means for locking said cage, a source of pressure-supply to said receptacle, and means whereby said receptacle is in communication with said source of pressure-supply at all times except when said valve is in exhausting position; substantially as described.

10. In a pneumatic elevator, the combination with the cage, cables and hoisting-cylinder, of a valve for controlling pressure in said cylinder, and a pneumatic lock which is rendered effective independent of the cylinder-supplying position of the main valve for holding the cage at the top of the shaft, said lock being rendered ineffective when the main valve is actuated to exhaust pressure from the cylinder; substantially as described.

11. In a pneumatic elevator, the combination with the cage, cables and hoisting-cylinder, of a valve for controlling pressure in said cylinder, and an independently-operable auxiliary valve for admitting pressure to the cylinder and means for opening said valve when the cage is at its upper landing, pressure being cut off from said auxiliary valve when the main valve is moved to a position to exhaust the pressure from the hoisting-cylinder; substantially as described.

12. In a pneumatic elevator, the combination with the cage, cables and hoisting-cylinder, of a valve for controlling pressure in said cylinder, and an independently-operable auxiliary valve for admitting pressure to the cylinder when the cage is in its upper position of rest, said first-mentioned valve being connected to said cylinder by a passage independent of control by said auxiliary valve; substantially as described.

13. The combination with a hoisting-cylinder, of means for controlling the pressure therein, said means comprising a main valve, and an auxiliary valve, said main valve having connection with said cylinder which is independent of control by said auxiliary valve, the pressure in said auxiliary valve being controlled by the main valve; substantially as described.

14. In a pneumatic elevator, the combination with a hoisting-cylinder, of a valve for controlling the pressure in said cylinder, and an auxiliary valve having means for admitting full pressure into said cylinder, the pressure in said auxiliary valve being controlled by said first-mentioned valve, and said valves controlling independent passages to said cylinder; substantially as described.

15. In a pneumatic elevator, the combination with the hoisting-cylinder, of a main valve for admitting and exhausting pressure to and from said cylinder, and an auxiliary valve which is opened by the cage of the elevator, said auxiliary valve having means for admitting full pressure into said cylinder when said cage reaches its upper position of rest; substantially as described.

16. In a pneumatic elevator, the combination with the cage, cables and hoisting-cylinder, of a main valve for admitting and exhausting pressure to and from said cylinder, a controlling-rope for operating said main valve, and an auxiliary valve operated by the cage to admit full pressure into the cylinder when the cage is at the top of the shaft; substantially as described.

17. In a pneumatic elevator, the combination with the cage, cables and hoisting-cylinder, of a main valve for admitting and exhausting pressure to and from said cylinder, an auxiliary valve for receiving full pressure from said main valve prior to the admission of pressure into the cylinder, means for operating said auxiliary valve when the cage is at the top of the shaft, and a controlling-rope for said main valve; substantially as described.

18. In a pneumatic elevator, the combination with the cage, cables and hoisting-cylinder, of a slide-valve for admitting and exhausting pressure to and from said cylinder, means for operating said slide-valve, an auxiliary valve for receiving pressure from the first-mentioned valve and delivering pressure into the cylinder, and means on the cage for coöperating with said auxiliary valve and admitting full pressure into the cylinder when the cage is at the top of the shaft; substantially as described.

19. In a pneumatic elevator, the combination with the cage, cables and hoisting-cylinder, of means for controlling the pressure in said cylinder, said means comprising a chambered valve-casing, one of whose chambers is in constant communication with the cylinder, another of whose chambers is in constant communication with the source of supply, another of whose chambers is in constant communication with the exhaust, and another of whose chambers is in constant communication with an auxiliary valve, of a valve at one side of said chambers for controlling the ports leading to and from said chambers, an auxiliary valve which is designed to be operated by the cage, and a connection between said auxiliary valve and the cylinder, whereby, when the cage is at the top of its shaft, said auxiliary valve is operated to establish communication between the source of supply and the cylinder; substantially as described.

20. In a pneumatic elevator, the combination with the cage, cables and cylinder, of means for controlling the pressure in said cylinder, said means comprising a chambered valve-casing, the end chambers of which are respectively in communication with the source of supply and exhaust, respectively, and two intermediate chambers, one of which is in constant communication with the cylinder, and the other of which is in constant communication with the auxiliary valve, said last-mentioned chamber having its port opening between the inlet-port and the port leading to the chamber in constant communication with the cylinder, a valve coöperating with said ports, whereby, when said valve is manipulated to admit pressure to the cylinder, the chamber in communication with the auxiliary valve is first opened and then pressure is admitted to the cylinder, and, when said valve is moved to establish communication between the cylinder and the exhaust, said auxiliary-valve chamber is closed before said exhaust communication is established; an auxiliary valve in communication with the intermediate chamber above mentioned and in communication with the cylinder, and means on the cage for operating said auxiliary valve when the cage is at the top of the shaft; substantially as described.

21. In a pneumatic elevator, the combination with the cage, cables and hoisting-cylinder, of means for controlling pressure in said cylinder, said means comprising a valve-casing 3, containing a pressure-chamber 9, an auxiliary valve-chamber 12, a chamber 15 in constant communication with the cylinder, and an exhaust-chamber 16, a slide-valve J containing a recess 17 for coöperating with the ports leading to and from said chambers, a pipe 13 leading to an auxiliary valve, and a pipe 4 leading from said auxiliary valve to the cylinder, and a stem on said auxiliary valve projecting outside of its casing and into the path of the cage, whereby said valve is operated when the cage is at the top of the shaft to admit full pressure through the pipes 13 and 4 to the hoisting-cylinder; substantially as described.

22. In an elevator, the combination with the cage, cables, hoisting-cylinder, and valve for controlling the admission and exhaust of motive fluid to and from said cylinder, said valve having provision whereby it can rest in a normal position partially opening its port, of a controlling-rope for operating said valve, and means coöperating with said controlling-rope, said means restoring the valve to its said normal position when the controlling-rope is manipulated beyond a predetermined point and throws said valve to an abnormal position; substantially as described.

23. In an elevator, the combination with the cage, cables, hoisting-cylinder, and valve for controlling the admission and exhaust of motive fluid to and from said cylinder, said valve having provision whereby it can rest in a normal position partially opening its port, of a controlling-rope for operating said valve, and means coöperating with said controlling-rope, said means restoring the valve to its said normal position when the controlling-rope is manipulated beyond a predetermined point and throws said valve to an abnormal position in either direction; substantially as described.

24. In an elevator, the combination with the cage, cables, hoisting-cylinder and valve for controlling the admission and exhaust of motive fluid to and from said cylinder, said valve having provision whereby it can rest in a predetermined position partially opening its port, of a controlling-rope for operating said valve, and a movable weight which is lifted by said controlling-rope when the valve is moved beyond said predetermined position; substantially as described.

25. In an elevator, the combination with the cage, cables, hoisting-cylinder and valve for controlling the admission and exhaust of motive fluid to and from said cylinder, said valve having provision whereby it can rest in a predetermined position partially opening its port, of a controlling-rope for operating said valve, and a movable weight which is lifted by the controlling-rope when the valve is moved beyond said predetermined position in either direction; substantially as described.

26. In an elevator, the combination with the cage, cables, hoisting-cylinder and valve for controlling the admission and exhaust of motive fluid to and from said cylinder, of a controlling-rope for operating said valve, a weight which is lifted by the controlling-rope when the valve is moved beyond a predetermined position, and a stop for limiting the movement of said weight; substantially as described.

27. In an elevator, the combination with the controlling-rope, of a button on said rope, blocks arranged in the path of said button, a cable for connecting said blocks, a weight secured to said cable, and abutments with which said blocks coöperate; substantially as described.

28. In an elevator, the combination with the controlling-rope, of a button arranged thereon, a weight coöperating with said button, a cable attached to said weight, a block arranged on the other end of said cable for coöperating with said button, a guide-rod for said weight and block, and adjustable collars on said rope for limiting the movement of said weight and block; substantially as described.

29. In an elevator, the combination with a cage, cable, cylinder and valve for controlling the pressure of motive fluid in said cylinder, of means for operating said valve, and mechanism for automatically restoring said valve to a predetermined position partially opening its port when its movement exceeds such predetermined position; substantially as described.

30. In an elevator, the combination with a cage, cables, hoisting-cylinder and valve for controlling the pressure in said cylinder, a controlling-rope for operating said valve, which controlling-rope moves a short distance in said travel from the admission to the exhaust position of the valve, and vice versa, an auxiliary locking-valve which has pressure admitted to, or cut off from, it in such dead travel of the hoisting-rope, a projection on said hoisting-rope, and adjustable devices coöperating with said projection for limiting the admission and exhaust positions of the main valve, said devices being yielding, permitting said valve to be moved to an abnormal position in either direction, and said devices exerting a constant energy to restore the main valve to its ordinary service position, and becoming operative when the controlling-rope is released; substantially as described.

31. In an elevator mechanism or the like, the combination with a cage, and a power mechanism therefor including a hoisting-cylinder, of a motive-fluid passage in communication with a source of supply and with said cylinder, a second motive-fluid passage, a port between said passages, a valve controlling said port, and means for automatically operating said valve whereby it opens said port when the cage is at a limit of its travel; substantially as described.

32. In an elevator mechanism or the like, the combination with an elevator-cage, of a hoisting-cylinder and its piston and piston-rod, said cylinder having a port, a valve arranged to admit and exhaust pressure through said port to and from said cylinder, a hand-rope for operating said valve, said valve and its port having means to delicately grade the admission and control the exhaust of air, means on the hand-rope coöperating with the cage to gradually move the valve toward the position to close the port as the cage reaches its upper limit, means on said hand-rope also coöperating with said cage to gradually move said valve toward the position to close said port as the cage reaches its lower limit, and an auxiliary valve for quickly admitting air to said cylinder when the cage reaches its upper limit of travel, said auxiliary valve being operated by the movement of the cage; substantially as described.

33. In an elevator mechanism or the like, the combination with an elevator-cage, of a hoisting-cylinder and its piston and piston-rod, said cylinder having a port, a valve for admitting and exhausting pressure through said port to and from said cylinder, said valve and its port having means to delicately grade the admission of air and control the exhaust of air to and from said cylinder, a hand-rope for operating said valve, an arm on the cage, a button on the hand-rope coöperating with said arm to gradually move said valve toward a position to close said port as the cage reaches its upper limit, a second button on the hand-rope coöperating with said arm on the cage and arranged to gradually move said valve toward the position closing said port as the cage approaches its lower limit, and an auxiliary valve for quickly admitting air to said cylinder when the cage reaches its upper limit of travel, said auxiliary valve being operated by the movement of the cage; substantially as described.

In testimony whereof I hereunto affix my signature, in the presence of two witnesses, this 5th day of February, 1901.

GEORGE F. STEEDMAN.

Witnesses:
    WM. H. SCOTT,
    GEORGE BAKEWELL.